United States Patent [19]
Fish et al.

[11] Patent Number: 5,901,000
[45] Date of Patent: May 4, 1999

[54] SOUND REDUCED ROTATABLE POLYGON ASSEMBLY

[75] Inventors: Gerald Lee Fish; David Kurt Klaffenbach, both of Versailles, Ky.

[73] Assignee: Lexmark International, Inc., Lexington, Ky.

[21] Appl. No.: 09/064,158

[22] Filed: Apr. 22, 1998

[51] Int. Cl.⁶ .................................................. G02B 26/08
[52] U.S. Cl. ........................................ 359/896; 359/216
[58] Field of Search .................... 359/196–226, 359/896; 347/245, 261, 263

[56] References Cited

U.S. PATENT DOCUMENTS

| | | | |
|---|---|---|---|
| 4,469,430 | 9/1984 | Terashima | 355/3 R |
| 5,206,754 | 4/1993 | Yano et al. | 359/196 |
| 5,506,719 | 4/1996 | Murakami et al. | 359/216 |
| 5,589,973 | 12/1996 | King et al. | 359/214 |
| 5,604,621 | 2/1997 | Fujikane | 359/200 |
| 5,671,081 | 9/1997 | Hisa | 359/216 |
| 5,675,431 | 10/1997 | Bock | 359/216 |

*Primary Examiner*—James Phan
*Attorney, Agent, or Firm*—John A. Brady

[57] ABSTRACT

Mirror (1) of a laser printhead has an octagonal outer configuration. During normal use the mirror is rotated at high speed, which drives ambient air which causes noise. To control the noise a shroud (11) surrounds the mirror and confines the air except at an opening in the shroud to permit a laser beam to reach the mirror and be reflected out. A rib extends over the mirror and near the area of the opening, positioned to reduce sounds created by the assembly.

7 Claims, 2 Drawing Sheets

SOUND REDUCED ROTATABLE POLYGON ASSEMBLY

TECHNICAL FIELD

This invention relates to reducing noise caused by the rotation of an element having an outside surface in the shape of a polygon, such as an octagonal mirror.

BACKGROUND OF THE INVENTION

Rotatable mirrors are commonly used in laser printers. The mirrors are a series of flat mirror surfaces combined to form a regular polygon. Each of the flat surfaces, as it rotates, directs a laser beam reflected from the surface to sweep across a photoconductor. This is widely practiced.

This invention is directed to reducing the noise caused by the air driven by the corners of the polygon. Such noise has a strong pure tone (single frequency) component. This invention employs a partially surrounding wall and a second wall, the second wall being located to cancel noise. Such cancellation of noise is believed to occur by the second wall causing air currents which are out of phase with those caused by the mirror.

It is known to add walls which result in noise reduction. In a commercial printer which is prior art to this invention, a rib was added near to and over a cooling fan for a power supply. The rib extended over generally one-half of the fan and was positioned on the side opposite power supply toward which the fan drove air. Other judicious positioning of sound reducing walls are known to be widely used, although the exact form and location may in each case be the result of trial and error.

DISCLOSURE OF THE INVENTION

The rotatable mirror of a laser printhead has an outer, reflective surface which describes a regular polygon. In normal operation the mirror is rotated rapidly around the center of the polygon at one, predetermined velocity. A circular wall surrounds the mirror and is taller than the mirror to confine ambient air which is driven by contact with the irregular rotating surface of the mirror. The circular wall has an opening to permit light to reach the polygonal surface of the mirror and to be reflected so as to sweep across a surface such as a photoconductor. A rib is located above the mirror and extends from a point over the mirror to a location past a circle coextensive with the wall. The rib is located to cancel noise which would otherwise be created by the mirror rotating past the wall at the velocity of normal operation.

BRIEF DESCRIPTION OF THE DRAWINGS

The details of this invention will be described in connection with the accompanying drawings, in which.

DESCRIPTION OF THE PREFERRED EMBODIMENTS

Figure 1:
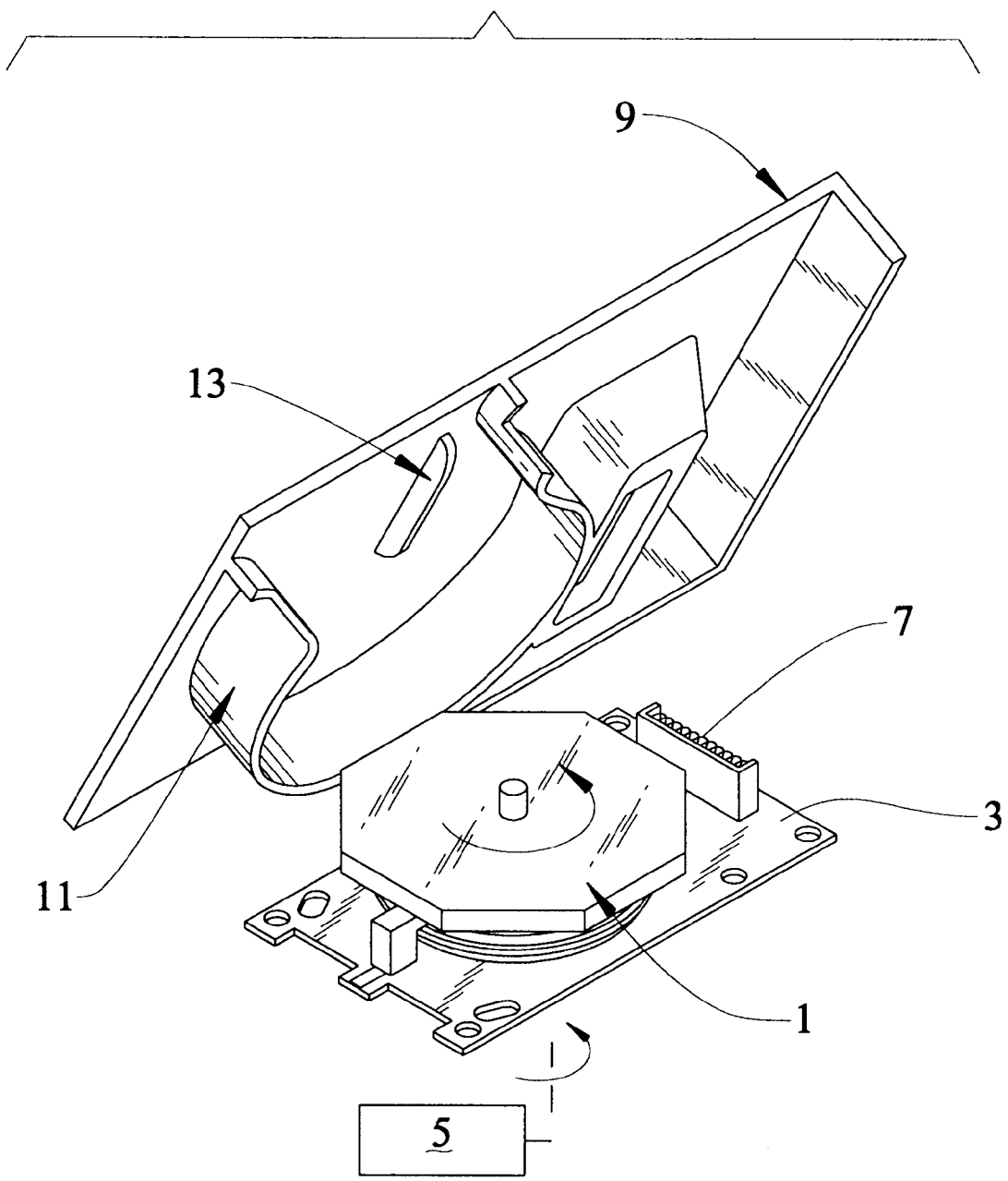
FIG. 1 is a perspective view with the cover rotated up for purposes of description.

With reference to FIG. 1, a rotatable mirror assembly is shown comprising a mirror 1, the outer surface of which describes a regular octagon. Each of the eight faces of the octagon of mirror 1 is reflective, as is standard in laser printheads. Mirror 1 is mounted on a frame member 3 for rotation around the center of the regular octagon of mirror 1. A motor 5, shown symbolically, in normal operation of the assembly rotates mirror 1 at a predetermined velocity. Also shown on frame member 3 are electrical contacts 7, which are not relevant to the sound reduction of this invention and which may be essentially standard for operation of a laser printhead.

Located opposite frame member 3 is a cover 9 which supports a depending wall or shroud 11 and also supports a thin, straight wall or rib 13. In the actual assembly, cover 9 is parallel to frame member 3 so that shroud 11 surrounds mirror 1. Shroud 11 is taller than the height of mirror 1 to thereby confine ambient air which is driven by the rotation of mirror 1.

Figure 2:
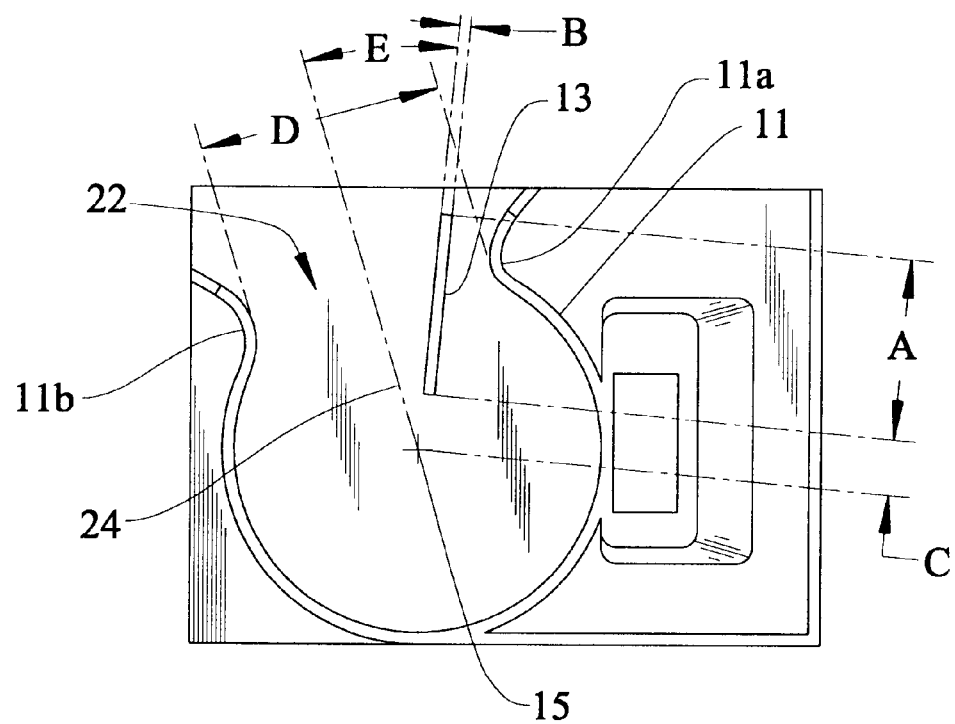
FIG. 2 is a plan view of the shroud and rib.

Shroud 11 and rib 13 are shown in more detail in FIG. 2, which is a plan view. Where shroud 11 exists it is located on a coextensive circle having center point 15 (shown by +) located over the center of mirror 1. The radius of this circle of shroud 11 is 30 mm. Shroud 11 does not exist and thereby defines an opening 22 which extends for 65° of the circle coextensive with shroud 11. (The size of opening 22 can vary so long as it is large enough to permit a beam of light to reach mirror 1 and be reflected out opening 22.) The sides 11a and 11b of opening 22 are bent away from opening 22 at a radius of 10 mm so as to avoid sharp corners which generate noise from ambient air driven by mirror 1. The extreme outer diameter of an imaginary circle circumscribing mirror 1 is 50 mm, leaving a separation of 5 mm between the corners of the octagon of mirror 1 and shroud 11.

Rib 13 is 30 mm long (dimension A) and 1.6 mm wide (dimension B). Rib 13 begins 10 mm from center point 15 (dimension C) and extends past opening 22. Opening 22 is 38.3 mm wide (dimension D). The length of rib 13 is directed at an angle of 22.5° (dimension E) from imaginary line 24, which is a radial line from center point 15 through the center of opening 22.

Figure 3:
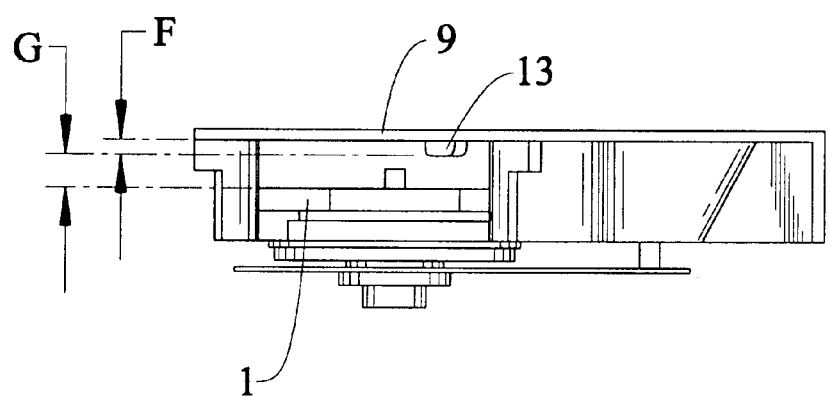
FIG. 3 is a side view of the assembly in cross section.

Referring to FIG. 3 rib 13 has a height of 3.5 mm (dimension F), and the lower surface of rib 13 is spaced 4.9 mm (dimension G) from the top of mirror 1. Rib 13 must be proximate to mirror 1 and extend to near opening 22 for adequate function. Preferably rib 13 extends past opening 22, which is the embodiment described.

In operation motor 5 rotates mirror 1 counterclockwise as shown in FIG. 1 and FIG. 2, which is in a direction at which outer surfaces of mirror 1 first approach side 11a of opening 22, which rib 13 is closer to than side 11b, and then these surfaces approach rib 13.

This assembly reduces pure tone noise typically at least 5 decibels and as much as about 10 decibels. Broad band noises are not affected, but are much less objectionable to human listeners.

It will be understood that the dimensions may vary somewhat while still providing an assembly in which sound is canceled. Accordingly, where dimensions are given, dimensions generally similar are applicable, particularly since any final design will normally involve some trial of actual apparatus and modification based on the observations.

We claim:

1. A sound reduced assembly comprising
   a rotatable member having an outer surface describing a regular polygon mounted at a first axis to rotate around generally the center of said polygon,
   a motor which drives said rotatable member around said first axis at a first rotational velocity during normal operation of said assembly,
   a circular wall surrounding said outer surface of said rotatable member except for an opening comprising generally 65° of a circle coextensive with said wall, said wall being taller than the height of said rotatable member and said wall enclosing said rotatable member to laterally confine ambient air between said wall and said rotatable member, and a generally straight rib extending into said opening of said circular wall and being of length extending from a position over said rotatable member to near said circle coextensive with said wall, said rib reducing sound created by said rotatable member when rotating at said first rotational velocity.

2. The assembly as in claim 1 in which said circle coextensive with said wall has a radius of generally 30 mm, said opening has a width of generally 38 mm and the extreme outer diameter of an imaginary circle circumscribing said regular polygon of said rotatable member is generally 50 mm.

3. The assembly as in claim 2 in which said regular polygon of said rotatable member is an octagon and said length of said rib is generally 30 mm, said rib having a width above said rotatable member of generally 1.6 mm, said rib extends toward said rotatable member generally 3.5 mm, and a lower surface of said rib is spaced from said rotatable member generally 4.9 mm.

4. The assembly as in claim 3 in which said rib has one end of said length of said rib located generally 10 mm from the center of said circle coextensive with said wall and said rib is located so that said length of said rib is on an angle of generally 22.5° degrees from a line from the center of said circle coextensive with said wall through the center of said opening of said wall toward the direction from which surfaces of said rotatable mirror approach during rotation of said rotatable body during normal operation of said assembly.

5. The assembly as in claim 1 in which said rib extends past said circle coextensive with the wall.

6. The assembly as in claim 2 in which said rib extends past said circle coextensive with the wall.

7. The assembly as in claim 3 in which said rib extends past said circle coextensive with the wall.

* * * * *